United States Patent [19]

Basuthakur et al.

[11] Patent Number: 6,113,034
[45] Date of Patent: Sep. 5, 2000

[54] METHOD AND APPARATUS FOR ESTIMATING EFFECTS OF DISTURBANCE FORCES

[75] Inventors: Sibnath Basuthakur, Phoenix; David Paul Bonello, Gilbert; Frank Hallett Buntschuh, Mesa, all of Ariz.

[73] Assignee: Motorola, Inc., Schaumburg, Ill.

[21] Appl. No.: 08/905,627

[22] Filed: Aug. 4, 1997

[51] Int. Cl.[7] ........................................... B64G 1/32
[52] U.S. Cl. ........................... 244/166; 701/13; 244/164
[58] Field of Search .................................. 244/164, 165, 244/166, 169; 701/13

[56] References Cited

U.S. PATENT DOCUMENTS

| 4,325,124 | 4/1982 | Renner ..................... 364/459 |
| 4,883,244 | 11/1989 | Challoner et al. ............... 244/166 |
| 5,413,293 | 5/1995 | Gomberg et al. ............... 244/166 |
| 5,452,869 | 9/1995 | Basuthakur et al. ............ 244/164 |
| 5,506,780 | 4/1996 | Montenbruck et al. ........ 244/164 |
| 5,540,405 | 7/1996 | Bender et al. .................. 244/165 |
| 5,655,735 | 8/1997 | Wirthman et al. ............. 244/164 |
| 5,788,189 | 8/1998 | Iida ................................ 244/166 |
| 5,862,495 | 1/1999 | Small et al. .................... 244/165 |

*Primary Examiner*—Galen L. Barefoot
*Attorney, Agent, or Firm*—Sherry J. Whitney; Frank J. Bogacz

[57] ABSTRACT

The attitude of a physical platform (62) is altered by a summation of forces from an attitude actuator (74), disturbance forces (80) and random noise (82). Attitude sensors (64) sense the attitude of the physical platform (62) and output measured attitude parameters to a disturbance force effects (DFE) filter (66) and an attitude filter (68). The DFE filter (66) outputs an attitude perturbation command to the attitude filter (68) and a command translator (72). Effects of the attitude perturbation are used by the DFE filter (66) to estimate the effects of disturbances on the physical platform (62). A trigger signal (76) from the attitude actuator (74) is used by DFE filter (66) to select an appropriate gain matrix used in the estimation process.

23 Claims, 3 Drawing Sheets

METHOD AND APPARATUS FOR ESTIMATING EFFECTS OF DISTURBANCE FORCES

FIELD OF THE INVENTION

The present invention relates generally to the field of attitude estimation and control.

More specifically, the present invention pertains to estimating the effects of attitude disturbing forces on a spacecraft.

BACKGROUND OP THE INVENTION

Satellite or spacecraft attitude and orbit control are essential requirements for the successful deployment of a space based communication system. A spacecraft in-orbit about the earth experiences disturbance forces that the alter spacecraft's attitude and orbital position. The most significant disturbance forces are due to gravity effects, solar pressure effects, magnetic field effects, and spacecraft aerodynamic effects. Gravitational disturbance forces are a result of spacecraft position in relation to the earth, moon, sun and other celestial bodies. Solar pressure or solar wind disturbance forces are a result of a radial outflow of charged particles from the sun. Magnetic field disturbance forces are a result of interaction between external magnetic fields and local spacecraft magnetic fields. Spacecraft aerodynamic disturbance forces are a result of forces acting on the physical surfaces of the spacecraft.

To control spacecraft attitude, compensation for these disturbance forces is accomplished through an attitude orbit control system (AOCS). An AOCS typically includes functional elements such as sensors, flight processors with embedded software and attitude actuators. Conventional attitude actuators include momentum wheels, propulsion thrusters and magnetic torquing actuators. Depending upon the spacecraft mission and function, any one or combination of the above mentioned or other attitude control methods may be used.

Magnetic control of spacecraft attitude is applicable for spacecraft in low earth orbit (LEO), medium earth orbit (MEO), and geostationary earth orbit (GEO). Utilization of a magnetic actuator is a cost effective and reliable option for a spacecraft attitude control. Typically, conventional AOCS configurations have been able to supply satisfactory attitude control for spacecraft performing conventional space based communication functions.

However, with the advent of laser an other communication technologies in space based communication systems, conventional spacecraft magnetic actuator attitude control is no longer satisfactory. Spacecraft involved in such communication applications require precise attitude control and/or antenna aiming. Unfortunately, conventional magnetic actuator and attitude control systems fail to provide accurate spacecraft attitude control or estimation due to an inability to accurately account for magnetic and other disturbance forces.

For a spacecraft in-orbit, magnetic disturbance forces are continually changing and are a result of interactions between external and local magnetic fields. The external magnetic field uncertainty occurs because the magnetic field which surrounds the earth is not uniform and therefore spacecraft orbiting the earth experience magnetic field fluctuations. The local magnetic field is uncertain because of changes in on-board electrical current flow. These current changes are dictated by spacecraft power requirements and produce magnetic disturbance in the form of local magnetic field fluctuations.

Conventionally these magnetic disturbance forces are estimated by equipping the spacecraft with a magnetometer and a computer model of the earth's magnetic field. An on-board computer processor may predict a current magnetic environment by evaluating magnetometer readings. The on-board computer processor may use a linear Kalman filter to predict how much reliance should be placed on inputs from various spacecraft sensors. Weighting factors determined by the linear Kalman filter are used to estimate spacecraft attitude.

A conventional attitude estimating system as discussed above can supply adequate attitude control for spacecraft performing conventional spaced based communication functions. However, estimating magnetic disturbance forces and spacecraft attitude by conventional means does not produce accurate attitude estimations and adjustments required by laser-link communication type spacecraft. What is needed is a more accurate method and apparatus for estimating magnetic disturbance forces and spacecraft attitude in order to precisely control a spacecraft's attitude.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Preferred embodiments of the present invention are herein described in the context of a space based communication satellite/spacecraft in orbit about the earth. However, the invention can be applied to spacecraft orbiting other celestial bodies and to other physical platforms such as an actuator system for a directional antenna.

Figure 1:
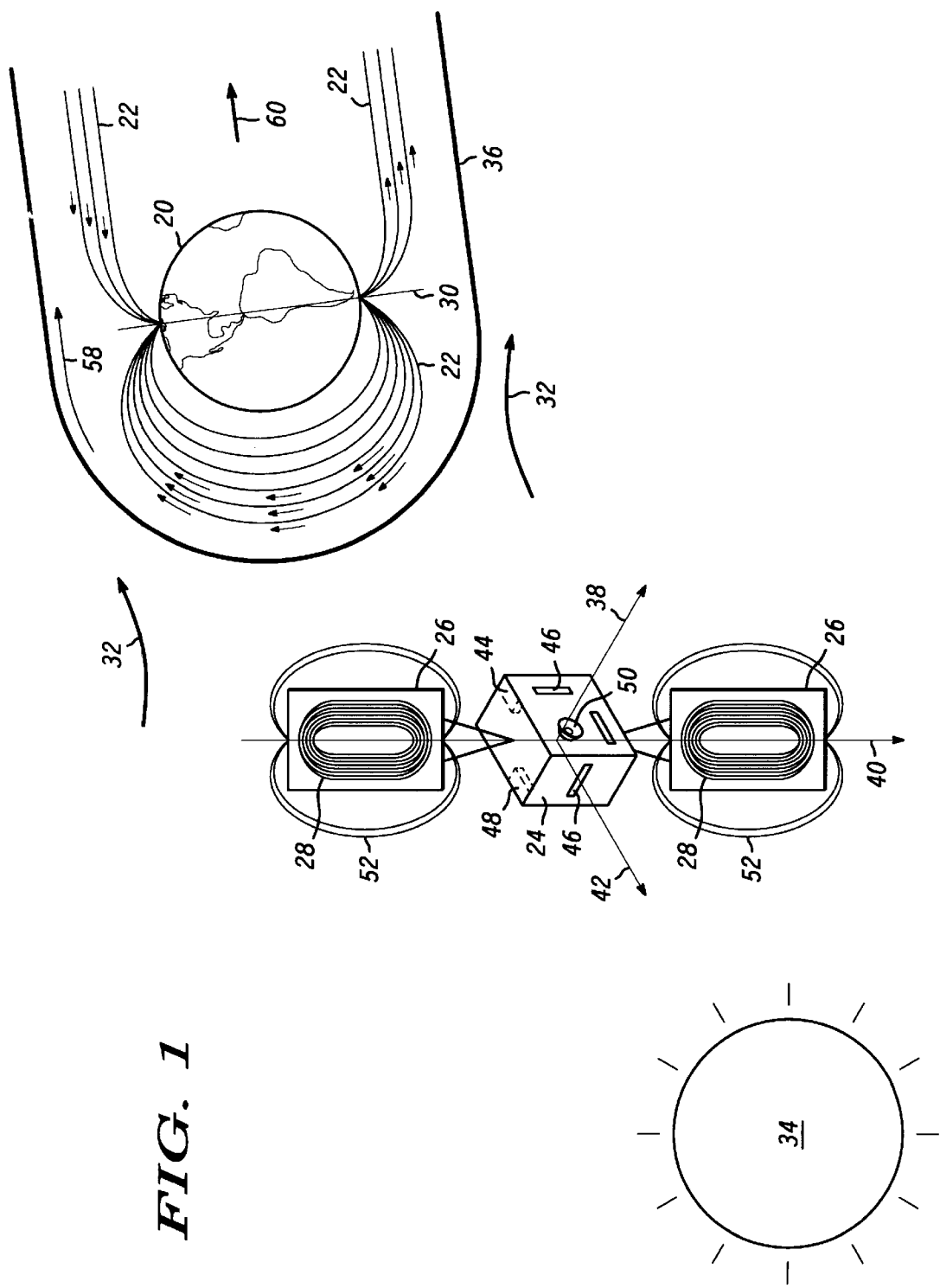
FIG. 1 shows a perspective view of the earth and its magnetic field in relation to an orbiting spacecraft in accordance with a preferred embodiment of the present invention.

FIG. 1 shows a perspective view of the earth 20, its magnetic field 22, a magnetic axis 30, and an orbiting spacecraft 24 in accordance with a preferred embodiment of the present invention. Spacecraft 24 is shown relative to three orthogonal reference axes, including a roll axis 38, a pitch axis 40 and a yaw axis 42. For the purposes of this description, "attitude" refers to any or all of position, rate and acceleration about any or all of roll, pitch and yaw axes.

Spacecraft 24 has solar panels 26 with magnetic coils 28 mounted on solar panels 26.

Magnetic coils 28 and other spacecraft components generate magnetic fields 52. Spacecraft 24 carries an attitude orbit control system (AOCS) sensor suite 44 and three magnetic torquing bars 46. For the embodiment depicted in FIG. 1, one magnetic torquing bar 46 is in roll axis 38 plane, a second is in pitch axis 40 plane and a third is in yaw axis 42 plane. Each magnetic torquing bar is capable of generating a magnetic field. Spacecraft 24 is also carrying a spacecraft control processor 48 and a propulsion thruster 50.

Magnetic disturbance forces acting on spacecraft 24 are a result of an interaction between earth's magnetic field 22 and magnetic fields generated by components of spacecraft 24. Relative to spacecraft 24, earth's magnetic field 22 is an external magnetic field. Magnetic fields generated by components of spacecraft 24, such as magnetic field 52 generated by solar panel magnetic coils 28, are local magnetic fields. Accurate determination of interaction between local magnetic field 52 of spacecraft 24 and external magnetic field 22 is hindered by unknown or uncertain quantities that are present in determining the magnetic fields. These unknown quantities in external and local magnetic fields are discussed below.

The earth's dipole magnetic field and dense atmosphere create a well developed magnetosphere that surrounds the earth. A solar wind 32 is created by a radial outflow of charged particles from the sun 34. As earth 20 travels supersonically through solar winds 32 a solar wind shock wave 36 is formed. Solar wind shock wave 36 alters the magnetosphere and creates an effective boundary layer called the magnetopause 58 which causes the magnetosphere to form a tail of magnetosphere 60. Therefore, magnetic field 22 surrounding the earth is not uniform or constant, and that introduces an unknown quantity into determining the earth's magnetic field 22. Conventional techniques for calculating the interaction of earth's magnetic field 22 with other magnetic fields are not precise because of these non uniform effects.

Furthermore, local magnetic field 52 generated by components of spacecraft 24 is continually changing due to fluctuations in current draw of spacecraft 24 components. For example, current draw for operation of communication antennas (not shown), solar panel magnetic coils 28, magnetic torquing coils 46, and other electrical components changes depending upon functional requirements of spacecraft 24. These continual changes in component current flow introduce an unknown quantity into the determination of the local magnetic field for spacecraft 24. These unpredictable local magnetic field fluctuations also result in imprecisions in conventional techniques for calculating the local magnetic field 52 of spacecraft 24.

Figure 2:
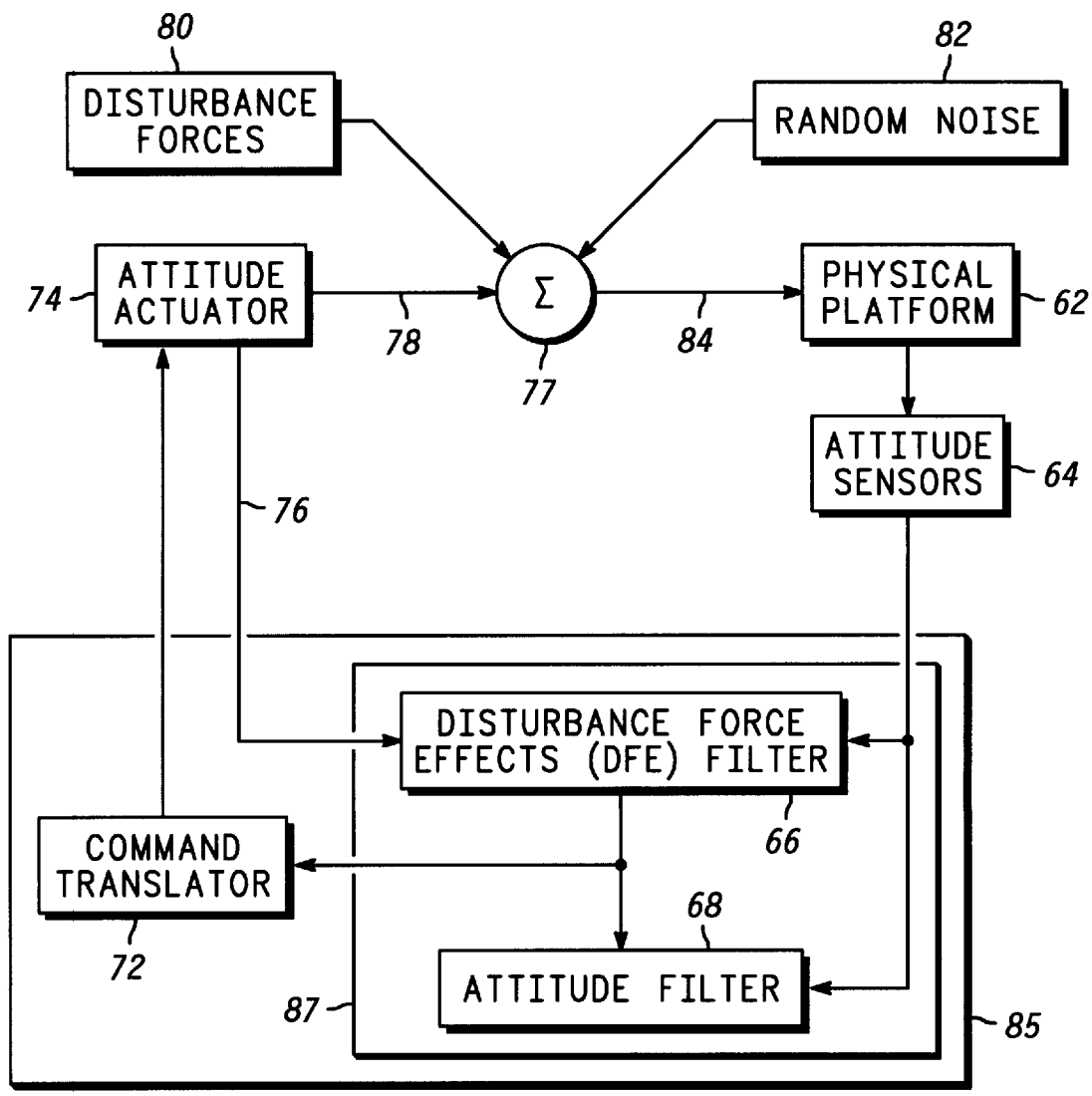
FIG. 2 shows a block diagram of an attitude control system in accordance with a preferred embodiment of the present invention.

FIG. 2 shows a block diagram of an exemplary attitude control system for a physical platform (e.g., a satellite) in accordance with a preferred embodiment of the present invention. Attitude control system includes attitude sensors 64, processor 85, attitude actuator 74, and summing block 77. In a preferred embodiment, processor 85 includes command translator 72 and filter 87.

In operation, physical platform 62 has on-board attitude sensors 64 that measure or sense the current attitude of physical platform 62. Attitude sensors 64 are physically coupled to physical platform 62, and outputs from attitude sensors 64 are electrical signals from individual sensors, such as gyros and GPS attitude sensors. Outputs from attitude sensors 64 are sent to filter 87 within processor 85. These outputs also could be sent to other spacecraft components (not shown).

In a preferred embodiment of the present invention, filter 87 is an extended Kalman filter 87, that includes disturbance force effects (DFE) filter 66 and attitude filter 68 to estimate attitude. Extended Kalman filter 87 estimates attitude without concern to type and origin of disturbance forces 80. Regardless of type or origin, such disturbances produce an effect on attitude and that effect is sensed by attitude sensors 64.

Specifically, within processor 85, outputs from attitude sensors 64 are sent to DFE filter 66 and attitude filter 68 within extended Kalman filter 87. Extended Kalman filter 87 gives accurate attitude estimates of the effects of disturbance forces on physical platform 62. This is done by use of a command-synchronous DFE filter 66, to estimate an actuator feed forward term that is input to attitude filter 68 and command translator 72. Attitude filter 68 is desirably a time-synchronous Kalman filter which estimates attitude by applying a gain matrix to attitude parameters of position, rate, and acceleration. Attitude filter 68 desirably uses a predetermined estimator update period to activate processing, which for a preferred embodiment is 16 milliseconds, making attitude filter 68 a time-synchronous filter.

DFE filter 66 determines a pattern in disturbance forces 80 by storing effects of past estimated actuator feed forward terms and issuing new actuator feed forward terms in response to sensed attitude and the past terms. Within processor 85, an output from DFE filter 66 couples to attitude filter 68 and to command translator 72.

An output from command translator 72 couples to an attitude actuator 74. Attitude actuator 74 receives an electrical signal from command translator 72 of processor 85 and translates that signal into a physical force through any of a variety of attitude altering devices.

Output 76 from attitude actuator 74 provides a signal to DFE filter 66 to indicate when an attitude perturbation has intentionally been made. DFE filter 66 synchronizes processing in accordance with this trigger signal, making DFE filter 66 a command-synchronous filter.

FIG. 2 indicates an output 78 of actuator 74 being summed in a summing block 77 with disturbance forces 80 and random noise 82. Those skilled in the art will appreciate that summing block 77 is a diagrammatic representation of a combining or summing of physical forces acting on physical platform 62.

Command attitude actuation forces are generally known, but random noise 82 and disturbance forces 80 are unknown. However, using DFE filter 66, effects of the summation of forces acting on physical platform 62 can be observed and to some extent the unknown forces can be predicted based on these observations, providing accurate attitude control. Summing block 77 outputs a resultant attitude force 84. This resultant attitude force 84 causes attitude changes to physical platform 62.

Those skilled in the art will recognize that processor 85 shown in FIG. 2 contains one or more processing devices (not shown) and related peripheral components (not shown). Related peripheral components could include memory, memory stores, and computer programs that, when executed, cause processor 85 to implement DFE filter 66, attitude filter 68, and command translator 72.

Referring also to FIG. 1 in conjunction with FIG. 2, in a preferred embodiment physical platform 62 could be a satellite or spacecraft such as spacecraft 24, although the present invention can also apply to other physical platforms such as an attitude estimator and/or actuator system for a directional antenna, for aircraft, or other vehicles. For the embodiment where physical platform 62 is spacecraft 24, attitude sensors 64 and attitude actuator 74 are desirably located in AOCS 44, and processor 85 is part of spacecraft control processors 48.

For the embodiment discussed above, disturbance forces 80 can include gravitational forces, aerodynamic forces, solar pressure forces and magnetic field forces. Magnetic field disturbance forces include forces resulting from the interaction of external magnetic field 22 and local magnetic field 52. A combination of unknown disturbance forces 80 and unknown random noise 82 make attitude estimation and control by conventional methods imprecise.

Attitude actuator 74 for spacecraft 24 can be a momentum wheel, a propulsion thruster 50, magnetic torquing bars 46, solar panel magnetic coils 28, and/or any combination of the above. For a preferred embodiment of the present invention, attitude actuator 74 is a magnetic field generator that can use magnetic torquing bars 46 and/or solar panel magnetic coils 28 to make actuate attitude adjustments to spacecraft 24. Attitude adjustment does not depend on what type or combination of types of attitude actuation spacecraft 24 has.

Attitude sensors 64 for spacecraft 24 can include a global positioning system (GPS), a set of three-axis gyros, a payload sensor such as cross-link antennas, a magnetometer for measurement of magnetic fields, and other sensors conventionally used to sense attitude related parameters, as part of AOCS 44 shown in FIG. 1. Those skilled in the art realize that an attitude position sensor and time can be used in place of an attitude rate measuring device such as a gyro. Since the effect of magnetic torquing through actuator 74 is sensed through on-board attitude sensors 64, sensed information provided by a magnetometer is not required by extended Kalman filter 87.

Equations 1–3, below, define an exemplary disturbance force effects (DFE) filter 66 for the preferred embodiment discussed above. The equations adopt a form which is known to those skilled in the art of Kalman filter implementation. Equations for estimates of actuator feed forward terms are shown for three orthogonal axes, including roll axis 38 (Eqn. 1), pitch axis 40 (Eqn. 2), and yaw axis 42 (Eqn. 3). The estimates of actuator feed forward terms $\Delta\hat{\omega}_i^{ff}(k+1)$ (i=1,2,3 for roll, pitch, and yaw axes) are:

$$[\Delta\hat{\omega}_1^{ff}(k+1)] = [\Delta\hat{\omega}_1^{ff}(k)] + [g_1][(\omega_1^m - \Delta\hat{\omega}_1^{ff}(k))] \quad \text{Eqn. 1}$$

$$[\Delta\hat{\omega}_2^{ff}(k+1)] = [\Delta\hat{\omega}_2^{ff}(k)] + [g_2][(\omega_2^m - \Delta\hat{\omega}_2^{ff}(k))] \quad \text{Eqn. 2}$$

$$[\Delta\hat{\omega}_3^{ff}(k+1)] = [\Delta\hat{\omega}_3^{ff}(k)] + [g_3][(\omega_3^m - \Delta\hat{\omega}_3^{ff}(k))] \quad \text{Eqn. 3}$$

where $\omega$=Actuator rate term, $\hat{\omega}$=Estimated actuator rate term, $\omega^m$=Rate measurement term, $\hat{\omega}^{ff}$=Estimated feed forward term, g=Actuator rate feed forward gain, and k=Update cycle number.

The term $\Delta\hat{\omega}_i^{ff}(k+1)$ represents the next estimated actuator feed forward term. The term $\Delta\hat{\omega}_i^{ff}(k)$ represents a past estimated actuator feed forward term. The term $[g_i][(\omega_i^m - \Delta\hat{\omega}_i^{ff}(k))]$ captures a pattern in effects of disturbance forces 80 (FIG. 2).

The term $\Delta\hat{\omega}_i^{ff}(k+1)$ characterizes attitude disturbance force effects and are output to attitude filter 68 and command translator 72 (FIG. 2). Logic for use of the trigger signal from output 76 of attitude actuator 74 (FIG. 2) is given in logic equations shown in Equations 4–5.

If trigger signal=inactive, then $g_1,g_2,g_3=0$     Eqn. 4

If trigger signal=active, then $g_1,g_2,g_3$=Gain Matrix     Eqn. 5

When the trigger signal is inactive, Kalman filter gain matrices $g_1$, $g_2$, and $g_3$ are set to zero, making next estimated actuator feed forward term $\Delta\hat{\omega}_i^{ff}(k+1)$ equal to past estimated actuator feed forward term $\Delta\hat{\omega}_i^{ff}(k)$. In other words, when no attitude actuation occurs to perturb the attitude, DFE filter 66 refrains from revising the estimated effects.

However, when the trigger signal is active, filter gain matrices $g_1$, $g_2$, and $g_3$ are assigned values from a Kalman gain matrix making next estimated actuator feed forward term $\Delta\hat{\omega}_i^{ff}(k+1)$ equal to the sum of past estimated actuator feed forward term $\Delta\hat{\omega}_i^{ff}(k)$ and term $[g_i][(\omega_i^m - \Delta\hat{\omega}_i^{ff}(k))]$. In this case DFE filter 66 revises the estimated effects characterized by feed forward terms in term $\Delta\hat{\omega}_i^{ff}(k)$ and term $[g_i][(\omega_i^m - \Delta\hat{\omega}_i^{ff}(k))]$. Of course, the Kalman filter gain matrix may likewise be revised (not shown). Accordingly, when an intentional attitude perturbation actuation is commanded, the attitude becomes perturbed, and DFE filter 66 is updated to track the effect of the perturbation on attitude. This effect will result from the intended perturbation, disturbance forces and random noise. By knowing the command perturbation, its resultant estimated effects and repetitively measuring platform attitude, DFE filter 66 generates an attitude model that accounts for unknown disturbance forces 80. Although disturbance forces 80 are not directly measured or estimated, their effects on platform attitude are observed and a precise and accurate attitude model of physical platform 62 is generated by DFE filter 66.

Equations 6–8 define attitude filter 68 for the preferred embodiment discussed above. Equations 6–8 describe attitude rate changes about each of the three orthogonal axes of roll, pitch and yaw over an updating period, which for one embodiment is 16 milliseconds. The total rate changes $\Delta\omega_i^t$ (i=1,2,3 for roll, pitch, and yaw axes) are:

$$\Delta\omega_1^t = \Delta\omega_1^{ff} + \left(\frac{I_2 - I_3}{I_1}\right)\hat{\omega}_3\hat{\omega}_2\Delta T + \hat{\alpha}_1^d\Delta T \quad \text{Eqn. 6}$$

$$\Delta\omega_2^t = \Delta\omega_2^{ff} + \left(\frac{I_3 - I_1}{I_2}\right)\hat{\omega}_3\hat{\omega}_1\Delta T + \hat{\alpha}_2^d\Delta T \quad \text{Eqn. 7}$$

$$\Delta\omega_3^t = \Delta\omega_3^{ff} + \left(\frac{I_1 - I_2}{I_3}\right)\hat{\omega}_1\hat{\omega}_2\Delta T + \hat{\alpha}_3^d\Delta T \quad \text{Eqn. 8}$$

where $\omega_i^{ff}$=Actuator feed forwards, $I_i$=Moments of inertia, $\hat{\omega}_i$=Rate estimates, $\hat{\alpha}_i^d$=Desired acceleration estimates, and $\Delta T$=Estimator update period.

A total attitude rate change term $\Delta\omega_i^t$, equals the sum of estimated feed forward term $\Delta\hat{\omega}_i^{ff}(k+1)$ from DFE filter 66 (Eqn. 1–3), a rate change term $$\left(\frac{I_i - I_i}{I_i}\right)\hat{\omega}_i\hat{\omega}_i\Delta T,$$

that is a result of asymmetric configuration of spacecraft 24, and a rate change term $\hat{\alpha}_i^d\Delta T$, which results from estimated desired acceleration.

Equations 9–11 describe attitude position changes about each of the three orthogonal axes of roll, pitch, and yaw for spacecraft 24 configured with a pitch axis momentum wheel. Roll, pitch, yaw position changes ($\Delta\phi, \Delta\theta, \Delta\psi$) and rate changes are, respectively:

$$\Delta\phi = \hat{\omega}_1\Delta T + \frac{1}{2}\Delta T\Delta\omega_1^t + \Omega\hat{\psi}\Delta T \quad \text{Eqn. 9}$$

$$\Delta\theta = \hat{\omega}_2\Delta T + \frac{1}{2}\Delta T\Delta\omega_2^t \quad \text{Eqn. 10}$$

-continued $$\Delta\psi = \hat{\omega}_3 \Delta T + \frac{1}{2}\Delta T \Delta\omega_3^t - \Omega\hat{\phi}\Delta T \qquad \text{Eqn. 11}$$

where $\Omega$=Orbit rate.

A total attitude position change term equals the sum of position changes due to attitude rate change term $\Delta\omega_i^t$ from equations 6–8, attitude rate, and orbit rate, depending on the axis.

Estimated attitude of spacecraft 24 is defined by position, rate and acceleration as given by Equations 12–20, which includes terms $\Delta\omega_i^t$ and $\Delta\phi,\Delta\theta,\Delta\psi$ from equations 6–8 and 9–11, respectively. Position (Eqn. 12–14), rate (Eqn. 15–17), and acceleration (Eqn. 18–20) estimates are:

$$\hat{\phi}(k+1)=\hat{\phi}(k)+\Delta\phi+K^{\Phi}(\phi^m-\hat{\phi}(k)-\Delta\phi) \qquad \text{Eqn. 12}$$

$$\hat{\theta}(k+1)=\hat{\theta}(k)+\Delta\theta+K^{\Theta}(\theta^m-\hat{\theta}(k)-\Delta\theta) \qquad \text{Eqn. 13}$$

$$\hat{\psi}(k+1)=\hat{\psi}(k)+\Delta\psi+K^{\Psi}(\psi^m-\hat{\psi}(k)-\Delta\psi) \qquad \text{Eqn. 14}$$

$$\hat{\omega}_1(k+1)=\hat{\omega}_1(k)+\Delta\omega_1^t+K^{\omega 1}(\omega_1^m-\hat{\omega}_1(k)-\Delta\omega_1^t) \qquad \text{Eqn. 15}$$

$$\hat{\omega}_2(k+1)=\hat{\omega}_2(k)+\Delta\omega_2^t+K^{\omega 2}(\omega_2^m-\hat{\omega}_2(k)-\Delta\omega_2^t) \qquad \text{Eqn. 16}$$

$$\hat{\omega}_3(k+1)=\hat{\omega}_3(k)+\Delta\omega_3^t+K^{\omega 3}(\omega_3^m-\hat{\omega}_3(k)-\Delta\omega_3^t) \qquad \text{Eqn. 17}$$

$$\hat{\alpha}_1^d(k+1)=\hat{\alpha}_1^d(k)+K_1^{\alpha}(\phi^m-\hat{\phi}(k)-\Delta\phi)+K_1^{\beta}(\omega_1^m-\hat{\omega}_1(k)-\Delta\omega_1^t) \qquad \text{Eqn. 18}$$

$$\hat{\alpha}_2^d(k+1)=\hat{\alpha}_2^d(k)+K_2^{\alpha}(\theta^m-\hat{\theta}(k)-\Delta\theta)+K_2^{\beta}(\omega_2^m-\hat{\omega}_2(k)-\Delta\omega_2^t) \qquad \text{Eqn. 19}$$

$$\hat{\alpha}_3^d(k+1)=\hat{\alpha}_3^d(k)+K_3^{\alpha}(\psi^m-\hat{\psi}(k)-\Delta\psi)+K_3^{\beta}(\omega_3^m-\hat{\omega}_3(k)-\Delta\omega_3^t) \qquad \text{Eqn. 20}$$

where $K^{\Phi}, K^{\Theta}, K^{\Psi}$=Estimated position update gains, $K^{\omega i}$=Estimated rate update gains, $\omega_i^m$=Gyro measurements, $K_i^{\alpha}, K_i^{\beta}$=Acceleration update gains, and K=Update cycle number.

Those skilled in the art of Kalman filter implementation, will recognize that equations 12–20 are presented in a conventional form for estimating attitude, except for the influence of feed forward term $\Delta\hat{\omega}_i^{ff}(k+1)$ and terms $\Delta\omega_i^t$ and $\Delta\phi,\Delta\theta,\Delta\psi$ which result therefrom. The inclusion of these terms makes equations 12–20 describe a nonlinear Kalman filter. In other words, DFE filter 66 (FIG. 3) and attitude filter 68 together form extended Kalman filter 87.

Figure 3:
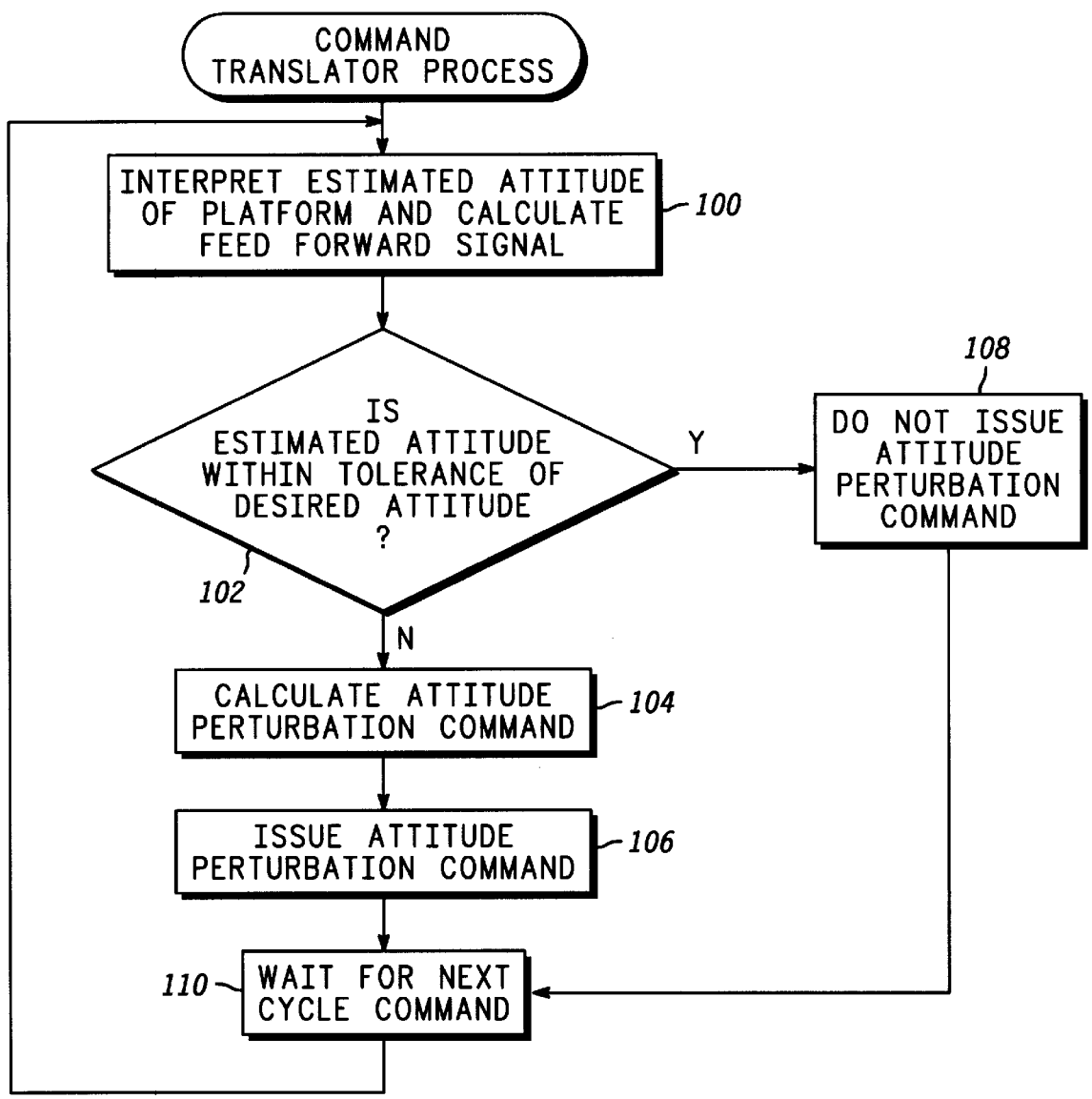
FIG. 3 shows a flow chart of a command translator process in accordance with a preferred embodiment of the present invention.

FIG. 3 shows a flow chart of a process performed by an exemplary command translator 72 (FIG. 2) for the preferred embodiment discussed above. Referring also to FIG. 2, an input task 100 interprets an estimated attitude of physical platform 62, as input by attitude filter 68 and a calculated feed forward signal as input by DFE filter 66. A query task 102 determines if the estimated attitude from task 100 is within tolerance of a desired attitude. This query task 102 determines when to sequentially command a plurality of attitude perturbations from attitude actuator 74.

If the query answer is yes, then a task 108 is executed and no attitude perturbation command is issued. If the query answer is no, then a task 104 is executed and an attitude perturbation command is calculated. Calculations are performed to determine an attitude perturbation that will cause the platform attitude to more closely resemble a desired attitude. Next a task 106 issues a command which will lead to this attitude perturbation. However, as discussed above, the actual resulting perturbation will also be influenced by disturbance forces and noise.

For a preferred embodiment, attitude actuator 74 is a magnetic field generator and the perturbation command issued by task 106 causes the magnetic field generator to create a local magnetic field 52 that interacts with external magnetic field 22 (FIG. 1) to produce a force necessary to achieve the attitude perturbation commanded. After executing either task 106 or task 108, control processing transfers to a delay task 110, which delays processing and awaits initiation of the next command cycle before returning control processing to command translator 72.

In summary, the present invention inputs estimated attitude perturbations into an attitude actuator system and uses the effects of these attitude perturbations to determine a pattern in attitude disturbances. By operating a disturbance force effects filter synchronously with command perturbations, uncertainties in disturbance forces, and particularly in the external magnetic field, are tracked and predicted. These disturbance force effects predictions are fed forward and used in estimating platform attitude.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for precisely modeling attitude of a physical platform, said attitude being responsive to unknown disturbance forces, and said method comprising the steps of:
   a) repetitively measuring said attitude;
   b) obtaining a trigger signal which indicates when attitude perturbing events occur;
   c) estimating effects of said disturbance forces on said attitude in response to said measured attitude and said trigger signal, said estimated effects being characterized by a feed forward signal; and
   d) estimating attitude in response to said feed forward signal and said measured attitude.

2. A method as claimed in claim 1 wherein said estimating effects step c) comprises the steps of:
   storing past estimates of said effects; and
   making future estimates of said effects responsive to said past estimates.

3. A method as claimed in claim 1 wherein said estimating effects step c) comprises the steps of:
   determining a pattern in said effects; and
   producing said feed forward signal in response to said pattern.

4. A method as claimed in claim 1 additionally comprising the step of performing said estimating effects step c) and estimating attitude step d) using an extended Kalman filter.

5. A method as claimed in claim 1 wherein said estimating effects step c) comprises the step of revising said estimated effects when said perturbing events occur.

6. A method as claimed in claim 1 wherein said estimating effects step c) comprises the step of refraining from revising said estimated effects when said perturbing events do not occur.

7. A method as claimed in claim 1 wherein:
   said estimating effects step c) occurs synchronously with said perturbing events; and
   said estimating attitude step d) occurs synchronously with real time.

8. A method as claimed in claim 1 additionally comprising the step of initiating said perturbing events in response to said estimated attitude.

9. A method as claimed in claim 1 wherein:

said physical platform is a spacecraft in orbit about the earth, and said spacecraft emits a local magnetic field;

said local magnetic field interacts with an external magnetic field to produce at least a portion of said disturbance forces; and said method additionally comprises the step of activating a magnetic field generator to produce said attitude perturbing events.

10. A precision attitude control system for a vehicle, said attitude control system comprising:

a sensor configured to provide an attitude parameter;

an attitude actuator; and a processor coupled to said sensor and said attitude actuator, said processor being configured to repetitively estimate effects of disturbance forces on attitude in response to said attitude parameter and a trigger signal parameter output from said attitude actuator, and to sequentially command a plurality of attitude perturbations to said attitude actuator in response to said estimated effects.

11. An attitude control system as claimed in claim 10 wherein:

said vehicle is a spacecraft; and said spacecraft is configured to carry said attitude control system.

12. An attitude control system as claimed in claim 10 wherein:

said sensor is configured to measure one of an attitude rate and an attitude position about each of three orthogonal axes.

13. An attitude control system as claimed in claim 10 wherein said attitude actuator is a magnetic field generator.

14. An attitude control system as claimed in claim 10 wherein:

said vehicle is a spacecraft which emits a local magnetic field;

said local magnetic field interacts with an external magnetic field to produce at least a portion of said disturbance forces; and said attitude actuator is a magnetic field generator.

15. An attitude control system as claimed in claim 10 wherein:

said plurality of attitude perturbations produce a plurality of attitude changes which are sensed by said sensor; and said processor is configured to revise said estimated effects in response to said sensed attitude changes produced by said plurality of attitude perturbations.

16. An attitude control system as claimed in claim 10 wherein:

said processor is configured to implement an extended Kalman filter to estimate attitude and said effects of said disturbance forces on said attitude.

17. An attitude control system as claimed in claim 10 wherein:

said processor is configured to implement a first filter and a second filter;

said first filter provides a feed forward signal which characterizes said effects of said disturbance forces on attitude; and said second filter estimates attitude in response to said feed forward signal and said attitude parameter.

18. An attitude control system as claimed in claim 17 wherein said first filter is asynchronous and said second filter is synchronous.

19. An attitude control system as claimed in claim 17 wherein:

said first filter is synchronized with said commanded plurality of attitude perturbations; and said second filter is synchronized in real time.

20. An attitude control system as claimed in claim 10 wherein:

said processor is configured to estimate attitude of said vehicle in response to said estimated effects of said disturbance forces on attitude;

said processor is configured to implement a command translator that is responsive to said estimate of vehicle attitude; and said command translator is configured to determine when to issue perturbation commands and when to refrain from issuing perturbation commands.

21. An attitude control system as claimed in claim 10 wherein:

when one of said plurality of commanded attitude perturbations is input to said attitude actuator, said processor revises said estimated effects of said disturbance forces in response to said attitude parameter.

22. An attitude control system as claimed in claim 10 wherein:

when none of said plurality of commanded attitude perturbations is input to said attitude actuator, said processor refrains from revising said estimated effects of said disturbance forces in response to said attitude parameter.

23. A spacecraft comprising:

a sensor configured to measure attitude parameters that include one of an attitude rate and an attitude position about three orthogonal axes;

a magnetic field generator which alters spacecraft attitude on command and which activates a trigger signal when commanded to alter said spacecraft attitude; and a processor coupled to said sensor and said magnetic field actuator, said processor including a disturbance force effects filter that provides a feed forward signal which characterizes effects of disturbance forces on attitude, said disturbance force effects filter being updated in response to activation of said trigger signal, and an attitude filter that estimates attitude in response to said feed forward signal and said attitude parameters, said attitude filter being updated in synchronism with real time.

* * * * *